United States Patent [19]

Stehlik

[11] 3,742,529

[45] July 3, 1973

[54] RAISED SEAT PLATFORM

[76] Inventor: Richard C. Stehlik, 321 Sheridan Road, Winnetka, Ill. 60093

[22] Filed: Dec. 27, 1971

[21] Appl. No.: 212,018

[52] U.S. Cl. ............................ 5/118, 5/110, 5/114
[51] Int. Cl. ............................................. A45f 1/00
[58] Field of Search ...................... 5/112, 114, 117, 5/118; 297/438, 439

[56] References Cited
UNITED STATES PATENTS

| 2,313,834 | 3/1943 | Matthews | 5/94 |
| 3,208,407 | 9/1965 | Maskew | 5/94 |

Primary Examiner—Casmir A. Nunberg
Attorney—John A. Mitchell et al.

[57] ABSTRACT

A foldable bed is formed from a pair of substantially U-shaped end members joined together by a pair of connecting links. A flexible sheeting is secured to the frame formed by the U-shaped members and the connecting links and provides a support platform for the bed. A pair of swingable legs are provided on one side of the frame, each leg being connected to one of the U-shaped members. The connecting links are characterized by a pair of cut-outs forming end tabs for connection to the U-shaped members. One of the cut-outs is of lesser extent that the other whereby end portions of the U-shaped members may be pivoted about the tabs for folding the bed into a compact condition and, also, for supporting the members when the bed is extended to an open position.

4 Claims, 4 Drawing Figures

PATENTED JUL 3 1973

3,742,529

INVENTOR.
RICHARD C. STEHLIK
BY

ATTORNEYS

RAISED SEAT PLATFORM

BACKGROUND OF THE INVENTION

This invention relates to a foldable bed and, more particularly, to a platform which may be used temporarily in automobiles and removed therefrom and stored away.

The platform of the present invention may be used as a sleeping bed or a storage platform. In addition, it may also serve as a play area for young children. The platform is constructed with a single pair of legs attached to one side thereof, the support for the other side of the platform will normally be the rear seat of a vehicle. It is to be understood that if desired the same platform may be utilized with a piece of furniture, such as a sofa, or other suitable support as an extra sleeping area in a home. However, its primary intended use is in cooperation with the rear seat of an automobile.

In recent years there has been a large increase in automobile travel and much of this is probably due to the large number of high speed highways and turnpikes which have been constructed. As a result, it is not uncommon for people to drive extensive distances, often with small children. Normally, those who are not driving try and obtain some rest or sleep during the long trip. However, they often encounter a general discomfort in trying to sleep sitting up or on the narrow back seat of an automobile. It should be noted that it is not only children who often desire to sleep in the rear seat of an automobile during the long trip, but others such as sportsmen and salesmen.

SUMMARY OF THE INVENTION

The present invention provides a simple, inexpensive and yet sturdy foldable car bed which may be used with the rear seat of an automobile to provide a suitable sleeping or storage area.

Accordingly, it is an object of the present invention to provide such a simple, inexpensive and sturdy foldable car bed easily folded and stored away when not in use, and, yet, which may be manufactured from a minimum of parts.

DESCRIPTION OF THE ILLUSTRATED EMBODIMENT

Figure 1:
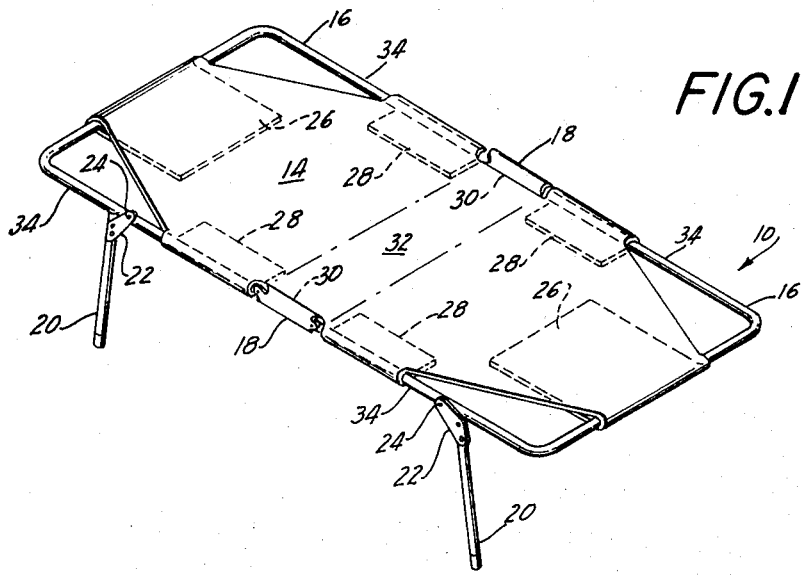
FIG. 1 is a perspective view of the foldable car bed of the present invention in an open or use position.

Referring to the drawings, a foldable car bed or cot 10 is shown. The bed is normally used in conjunction with a suitable support such as the rear seat 11 of an automobile, although it may also be used with a piece of furniture or a similar structure elsewhere.

The car bed 10 comprises a frame 12 to which is attached a covering 14, the covering serving as the platform of the bed. The frame 14 includes a pair of U-shaped end members 16 which are preferably made from a sturdy and lightweight material, such as tubular aluminum, and are connected together by a pair of links 18. To support the frame 12 and covering 14, a pair of legs 20 are connected to the members 16 by means of connectors 22. The connectors 22 are affixed to the legs 20 and moveably connected to the members 16 by means of pivots 24. The pivots 24 may be removeable if desired but they would normally be simple riveted connections.

The covering 14 may be of any suitable flexible sheeting material such as woven cloth or sheet plastic. The term "sheeting" as used herein is meant to include any flexible supporting material. The covering 14, in the illustrated embodiment, has end flaps 26 which wrap around the U-shaped frames 16 and are then stitched to the body of the covering so that it is securely and tautly affixed to the frame in a longitudinal direction. Side flaps 28 are similarly fastened to the side portions of the members 16 so as to securely and tautly support the covering 14 in a transverse direction.

Advantageously, the side flaps 28 are adjacent to the connecting links 18 and cut-out portions 30 in the covering 14. The cut-out portions 30 permit the bed to be folded without interfering with the operation of the links 18. Due to the close positioning of the side flaps 28 to the links 18, the unsupported central portion 32 of the covering 14 is also tautly held even when the bed is folded into a compact condition.

The U-shaped members 16 include a pair of arms 34 which are connected at their end portions 36 to a pair of tabs 38 on the ends of the links 18. The end portions 36 are connected to the tabs 38 by suitable pivots 40, such as loose rivets. The tabs 38 are formed by lower cut-outs 42 and upper cut-outs 44 at each end of the links 18. The extent of cut-out 44 is greater than cut-out 42.

The cut-out 44 is of sufficient extent to permit the end portions 36 to be pivoted at the pivot 40 and swung into engagement with that region of the link 18 adjacent to the lower or lesser cut-out 42. Accordingly, when the car bed 10 is in an open position and a load is placed on the covering 14, the end portions 36 of the arms 34 will be fully supported by the links 18, thus, providing a continuous frame and eliminating the necessity of any additional central support for the car bed.

Figure 2:
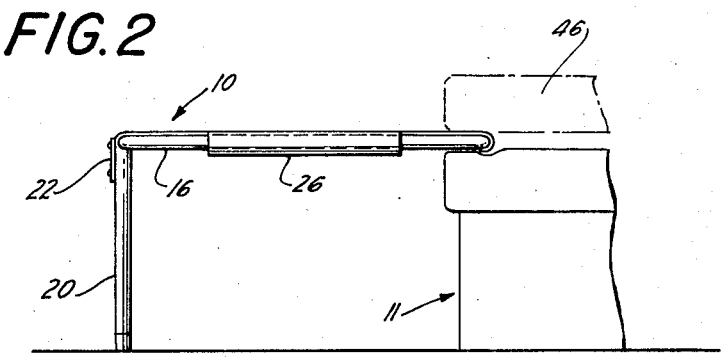
FIG. 2 is an end view of the foldable car bed of FIG. 1 showing it in cooperation with the rear seat of an automobile.
Figure 3:
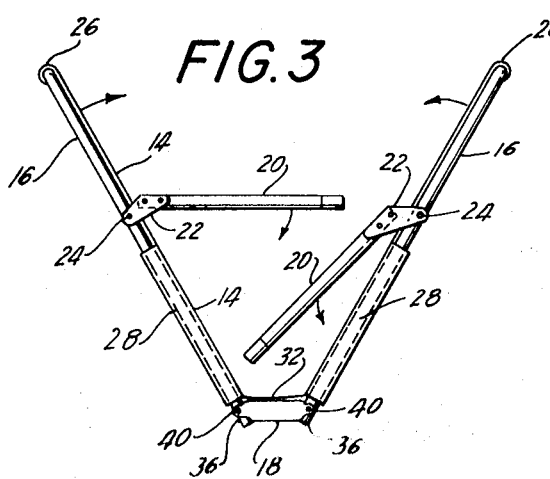
FIG. 3 is a side view of the foldable car bed of FIG. 1 showing it in the act of being folded into a substantially U-shaped condition for storage.
Figure 4:
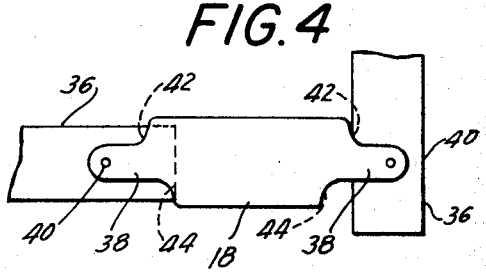
FIG. 4 is an enlarged, partially fragmentary view showing the relationship between the connecting links and the U-shaped end members forming the frame for the car bed.

Normally, the width of the car bed 10 will be sufficient to override the cushion of the seat in the rear of an automobile while abutting the back of the front seat of the automobile. Therefore, the need of rear supports other than the legs 20 is eliminated. If the car bed 10 is used in an environment other than an automobile, it may be supported between a pair of cushions, such as the cushion 46 shown in FIG. 2 in phantom lines.

While the illustrated embodiment is limited to a pair of U-shaped members with connecting links, it is to be understood that a longer car bed may be provided by merely including an additional center portion and an extra set of links. In such a situation the unit would be comprised of a roll-up or three-fold bed or cot rather than the two-fold system shown in the illustrated embodiment.

While the above description has been made in relation to the illustrated embodiment, it is to be understood that other constructions may be utilized which will be obvious to those skilled in the art but in accordance with the appended claims.

What is claimed is:

1. A foldable bed having a support platform area and adapted to be used with a raised seat, said bed comprising:
   a substantially rectangular shaped frame including
   a. a pair of substantially U-shaped end members, and
   b. a pair of links pivotally connecting said end members together;
   a flexible sheeting securely attached to said frame and forming the support platform;
   a pair of swingable leg supports each connected to one of the end members and adapted to cooperate with the car seat to support the frame and flexible covering;
   said connecting links having a pair of tab members at each at each end thereof pivotally connected to end portions of the U-shaped members;
   said tab members being formed by cut-out portions on opposite sides of said links, one cut-out being of lesser extent than the other whereby the end portions of the U-shaped members may be pivoted about the tabs and through the greater cut-outs for folding the bed into a compact condition and also for supporting the U-shaped members by the portions of the links adjacent the lesser cut-outs when the bed is extended into an open position for engagement with the raised seat.

2. A foldable bed as defined in claim 1 wherein the U-shaped members and the connecting links are formed from tubular metal material.

3. A foldable bed as defined in claim 2 wherein the connecting links are also formed from tubular metal material and the end portions of the U-shaped members are of a lesser cross-sectional extent than the distance between adjacent tab members and moveable in between.

4. A foldable bed as defined in claim 1 wherein the flexible sheeting is tautly attached to the support platform by means of securing means about the U-shaped members and adjacent to the links whereby the portion of the sheeting between said links remains taut under a load or when the bed is folded.

* * * * *